US00RE34325E

United States Patent [19]

Rau et al.

[11] E Patent Number: Re. 34,325

[45] Reissued Date of Patent: Jul. 27, 1993

[54] INTAKE SEAL FOR TANK VACUUM CLEANER

[75] Inventors: Jerome E. Rau, Hoffman Estates; Gary E. Palmer, Roselle, both of Ill.; Grace D. Labrador, Mesquite, Tex.

[73] Assignee: Hako Minuteman, Inc., Addison, Ill.

[21] Appl. No.: 875,260

[22] Filed: Apr. 27, 1992

Related U.S. Patent Documents

Reissue of:

[64] Patent No.: 4,964,189
Issued: Oct. 23, 1990
Appl. No.: 295,884
Filed: Jan. 12, 1989

[51] Int. Cl.[5] ..... A47L 5/36

[52] U.S. Cl. ..... 15/327.2; 15/327.6; 15/353; 285/7

[58] Field of Search ..... 15/327.2, 327.6, 353, 15/352, 327.1; 285/7

[56] References Cited

U.S. PATENT DOCUMENTS

| | | | |
|---|---|---|---|
| 2,103,050 | 12/1937 | White | 285/7 |
| 2,606,336 | 8/1952 | Balluff | 15/337 X |
| 2,653,343 | 9/1953 | Kunkler | 15/333 |
| 2,757,942 | 8/1956 | Eberhart | 285/7 |
| 2,898,622 | 8/1959 | Hurd | 15/333 |
| 2,908,933 | 10/1959 | Todd, Jr. et al. | 15/414 |
| 3,055,161 | 9/1962 | Hallstrom | 15/327.1 X |
| 3,069,186 | 12/1962 | Stevens | 15/400 X |
| 3,524,211 | 8/1970 | Wolf | 15/327.1 |
| 4,443,910 | 4/1984 | Fitzwater | 15/337 |

FOREIGN PATENT DOCUMENTS

| | | | |
|---|---|---|---|
| 1507514 | 12/1967 | France . | |
| 489984 | 8/1938 | United Kingdom | 285/7 |

*Primary Examiner*—Chris K. Moore
*Attorney, Agent, or Firm*—Emrich & Dithmar

[57] ABSTRACT

An adapter, mounted on the cylindrical sidewall of the vacuum cleaner tank, provides a receptacle for a rigid connector on which a flexible vacuum hose is sealingly mounted. The leading edge of the connector insert is beveled. A corresponding beveled surface is formed on the inner wall of the receptacle to engage and seal with the beveled leading edge of the connector to form a continuous, peripheral seal immediately adjacent to the wall of the tank so that when the vacuum motor is turned on, a positive force is generated to increase the effectiveness of the seal.

4 Claims, 1 Drawing Sheet

INTAKE SEAL FOR TANK VACUUM CLEANER

Matter enclosed in heavy brackets [ ] appears in the original patent but forms no part of this reissue specification; matter printed in italics indicates the additions made by reissue.

FIELD OF THE INVENTION

The present invention relates to vacuum cleaners. More particularly, it relates to a seal in the intake assembly of a vacuum cleaner more widely used in industrial and commercial applications or for shop clean-up, as distinguished from domestic use. In such vacuum cleaners, there is a desire to a accumulate a larger amount of debris before the vacuum cleaner has to be emptied, and such vacuum cleaners therefore have a fairly large reservoir for storing debris. Typically, such reservoirs are in the form of a cylindrical drum or tank and have the vacuum motor mounted to a lid which is sealed to the top of the tank. The proximate end of the hose is connected to the drum by means of the intake assembly.

BACKGROUND OF THE INVENTION

Tank vacuum cleaners for commercial or industrial use normally have a fairly large electric motor drawing air to generate the vacuum. The motor may be 1.5 to 2.0 HP, and capable of generating a substantial vacuum. Any leak in the intake assembly between the hose and the tank creates inefficiency and reduces the vacuum at the floor tool, thereby reducing the collection efficiency of the vacuum cleaner. Even where a seal is effected in the intake assembly, the seal has not always been properly located. For example, a seal which is formed upstream of the location of the trigger latch which releases the hose connector will permit leakage through the latch. Any such leakage not only reduces the efficiency of the vacuum cleaner, but it also creates a perception in the mind of the user of an inefficient, leaky and ineffective machine. Therefore, the prevention of leaks at the intake assembly is considered both a functional or use advantage and a sales feature.

SUMMARY OF THE INVENTION

The present invention creates a continuous, effective, peripheral seal between the intake adapter mounted to the vacuum tank and the hose connector. The adapter forms a receptacle in the form of a collar which telescopically receives the hose connector, and the leading edge of the connector is formed into a beveled surface having a frustoconical shape which is inclined radially inwardly of the intake and away from the direction of insertion. In other words, the apex of the cone would be on the axis of the connector and inwardly of its leading edge.

A corresponding beveled surface is formed on the adapter immediately adjacent the exterior surface of the cylindrical vertical wall of the tank. Thus, when a vacuum is generated within the tank by turning the motor on, that vacuum is communicated to the interior of the connector and to the hose itself. Atmospheric pressure thus forces the hose and the connector inwardly of the adapter and provides a positive force ensuring complete, sealing engagement of the mating, beveled surfaces respectively on the connector and the adapter.

Thus, the present invention forms a complete seal inwardly of the trigger latch or any other breach in the adapter without mechanical camming or screw forces to effect the seal, and does so under circumstances which increase the sealing force during use (that is, when the vacuum motor is turned on). Moreover, the inventive seal is formed in a manner which does not employ additional components such as O-rings which would increase the cost of materials, the cost of assembly and thus the cost to the end user.

Other features and advantages of the present invention will be apparent to persons skilled in the art from the following description of a preferred embodiment of the invention accompanied by the attached drawing wherein identical reference numerals will identify similar elements in the various views.

DETAILED DESCRIPTION OF A PREFERRED EMBODIMENT

Figure 1:
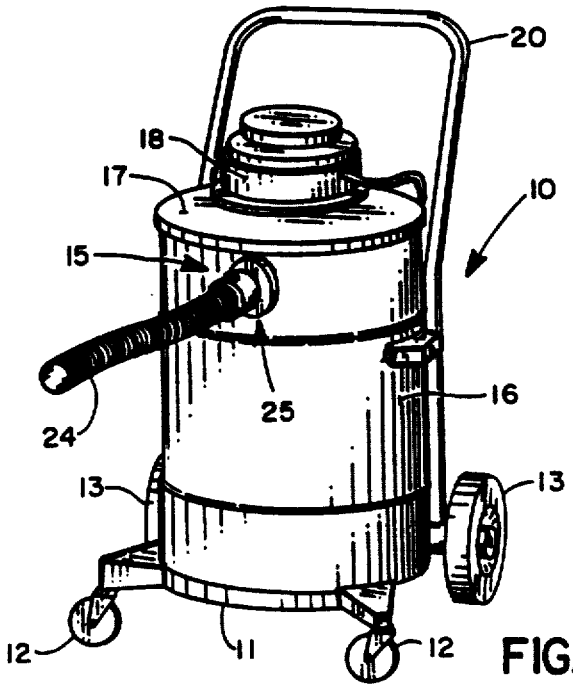
FIG. 1 is an upper perspective view of a tank vacuum cleaner incorporating the present invention.

Referring first to FIG. 1, reference numeral 10 generally designates a tank vacuum cleaner of a type widely used in industrial and commercial applications. The vacuum cleaner 10 includes a chassis 11 having a pair of caster wheels 12 and a pair of larger rear wheels 13 for facility in moving it about. It also includes a tank 15 having a bottom, a generally cylindrical upright side wall 16, and a lid 17. An electric motor 18 is mounted to the lid 17 and draws air from the interior of the tank 15 and exhausts clean, filtered air into the atmosphere. Thus, the refuse is collected within the tank 15.

A handle 20 is connected to the chassis 11 so that the vacuum cleaner may be moved more readily like a wheeled dolly.

The vacuum cleaner 10 is provided with a hose 24, the proximal end of the hose 24 being connected to the tank 15 by means of an adapter and intake assembly generally designated 25. The distal end of the hose may be provided with a conventional pick-up or ground cleaning tool, not shown. As is well-known, the electric motor 18 generates a vacuum within the tank 15, and that vacuum is communicated through the hose 24 which acts as a flexible conduit, to the pick-up or cleaning tool for suctioning air and debris through the hose and into the reservoir provided by the tank 15 where the refuse, particles and dust are filtered out and collected.

Figure 2:
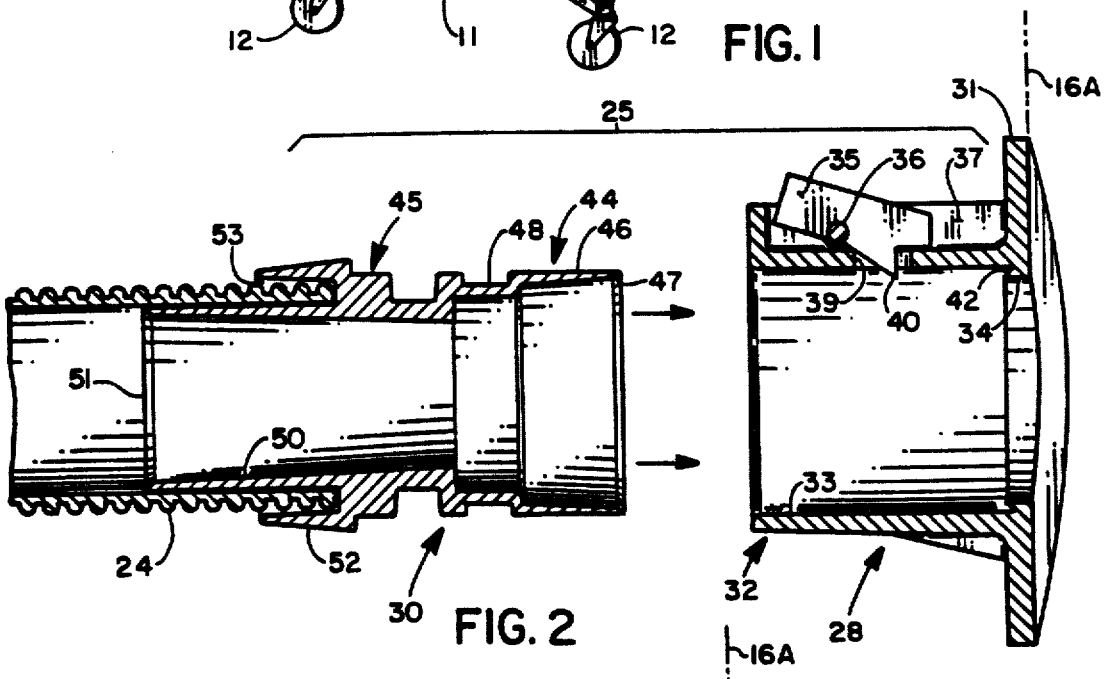
FIG. 2 is a vertical cross-sectional view of the intake assembly of the vacuum cleaner of FIG. 1, taken parallel to the axis of the adapter and showing the connector and adapter in exploded relation a they would be just prior to assembly.

Turning now to the adapter and intake assembly 25, as seen in vertical, axial cross-section and in exploded relation in FIG. 2, the intake assembly 25 includes an adapter generally designated 28 and a connector generally designated 30.

Turning first to the adapter, it includes a radially outwardly extending flange 31 which conforms to the shape of the outer surface of the cylindrical side wall 16 of the tank 15. That is, in vertical section the flange 31 appears straight, but in horizontal cross-section, it conforms to the curvature of the tank wall 16. The flange 31 is mounted to the wall of the tank by any suitable means, and the flange is sealed against the wall to prevent leakage. Immediately outboard (i.e. away from the tank) of the flange 31 is a receptacle generally designated 32 and taking the form of a collar or sleeve. The receptacle 32 includes a generally cylindrical side wall 33 having a slight taper—is, the cross-sectional area of the center of the wall 33 increases slightly when proceeding away from the flange 31 (i.e., upstream relative to the movement of air from the hose). A central aperture 34 in the flange 33 is aligned with a corresponding aperture in the wall 16 of the tank to permit the passage of air and refuse picked up in the resulting airstream.

At the top of the receptacle 32 there is a finger-actuated toggle member 35 rotatably mounted on a pin 36 which may be staked between a pair of adjacent walls extending axially of the receptacle 32 and above the cylindrical side wall 33, one of which axial walls is seen in FIG. 2 and designated 37.

An aperture 39 is formed in an upper intermediate location of the generally cylindrical wall 33 through which a latch 40 of the toggle member 35 extends. It is the aperture 39 or its equivalent which had created leaks in prior art intake assemblies.

A sealing surface 42 is located near the inner reach of the cylindrical wall 33 of the receptacle 32, adjacent the flange 31 and preferably as near to the wall of the tank 16 (schematically illustrated by chain line 16A in FIG. 2) as reasonably practicable. The sealing surface 42 is integrally formed in the adapter 32 and extends from the inner surface of wall 33 inwardly and preferably away from the container to which the adapter is mounted. Thus, the sealing surface 42 is beveled in a manner to receive the connector 30 in a continuous, peripheral sealing engagement as will be made clear presently.

Figure 3:
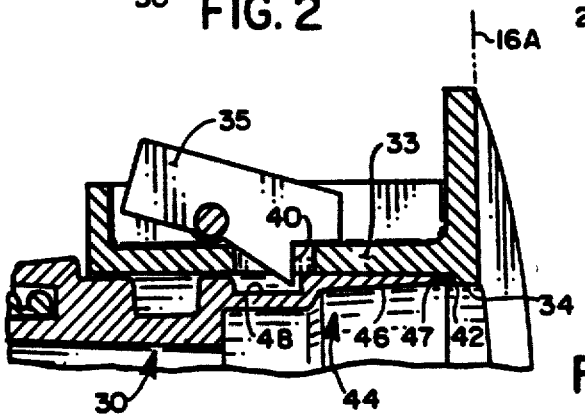
FIG. 3 is a vertical cross-sectional close-up fragmentary view, taken parallel to the axis of the adapter and intake assembly and showing the improved seal and its location.

Turning now to the connector 30, it includes an insert generally designated 44 and a seat for the hose 24, the seat being generally designated by reference numeral 45. The insert 44 defines at the innermost portion of the connector 30, a cylindrical wall 46 which is dimensioned to be telescopically received in the receptacle 32. The proximal edge of the insert wall 46 is formed into a beveled surface 47 which is constructed and arranged to engage and form a seal with the correspondingly beveled sealing surface 42 of the adapter 28. The insert 44 also includes a peripheral recess or groove 48 into which the latch 40 of the toggle member 35 is received when the insert is assembled to the adapter 28, as best seen in FIG. 3. This prevents accidental withdrawal of the connector from the adapter.

The hose seat 45 of connector 30 includes a cylindrical wall 50, the outer surface of which is slightly tapered to a progressively reduced diameter to the distal end 51 for receiving the proximal end of the hose 24. The hose seat 45 also includes an circumferential wall or skirt 52 which is conventionally spaced outwardly of the wall 50 to provide an annular space 53 for receiving the proximal end of the hose 24 and for protecting it against accidental dislodgment.

When the hose 24 is to be assembled to the connector 30, the connector and adapter are axially aligned as seen in FIG. 2, and the connector 30 is assembled to the adapter 28 by placing the insert 44 of the connector 30 telescopically into the receptacle 32 of the adapter 28 until the sealing surface 47 of the connector 30 engages the correspondingly beveled sealing surface 42 of the adapter. The two sealing surfaces thus form a continuous peripheral seal at a location on the adapter which is immediately adjacent the wall of the tank and downstream (in the direction of air flow into the tank 15) of the aperture 39 for the toggle member 35. The beveled surfaces are frusto-conical in shape with the apex of the cone located on the axis of the cylindrical walls 33, 46 outside the tank. Although this is preferred, the bevel could be facing the other way (i.e., with the apex inside the tank), but the illustrated embodiment insures proper location of the hose connector and applies an outward tension to the leading edge of the insert 44 during use.

It will be observed that the latch 40 need not cam the connector 30 into sealing engagement, nor is there any need for a mechanical sealing force (such as a screw force) on the connector other than that which is created by atmospheric pressure on the hose 24 and connector 30 which normally exists when the motor 18 is turned on to create a partial vacuum in the tank 15. In other words, the force on the connector 30 resulting from the pressure differential between atmospheric pressure and the partial vacuum created within the hose 24 and connector 30 provides a positive sealing force causing the correspondingly shaped sealing surfaces 42, 47 to form an even tighter seal, the greater the vacuum.

A wide range of materials may be used for the adapter 28 and connectors 30, but preferably they are formed of a molded plastic which is rigid after molding, such as polyethylene or ABS plastic.

Having thus disclosed in detail a preferred embodiment of the invention, persons skilled in the art will be able to modify certain of the structure which has been illustrated and to substitute equivalent elements for those disclosed while continuing to practice the principle of the invention; and it is, therefore, intended that all such modifications and substitutions be covered as they are embraced within the spirit and scope of the appended claims.

We claim:

1. In a vacuum cleaner having a tank providing a reservoir for collecting refuse, a motor coupled to said tank for generating a vacuum therein and a hose having a proximal end coupled to said tank and communicating the vacuum in said tank to a distal end for picking up debris and refuse and for routing said debris and refuse to said tank, an improved intake assembly comprising: an adapter mounted on a wall of said tank and including a generally cylindrical wall defining a receptacle having an inlet end and an outlet end, a beveled sealing surface on the interior of said receptacle immediately adjacent the outlet end thereof and extending continuously about said inner wall of said receptacle and spaced inwardly thereof said adapter further including an opening in said wall intermediate said inlet end and said outlet end for receiving a [toggle] latch mounted to said adapter and received in said opening; and a hose connector having a first end providing a cylindrical seat portion received in said proximal end of said hose for sealing therewith and a second end providing a cylindrical insert adapted for telescopic insertion into said inlet end of said receptacle and defining a leading beveled surface corresponding to and continuously sealingly engaging said sealing surface of said receptacle when said hose connector is assembled to said adapter, whereby a continuous circumferential seal is formed downstream of said opening in said adapter and adjacent the wall of said tank.

2. The apparatus of claim 1 wherein each of said beveled seating surfaces comprises a portion of a frusto-conical surface.

3. The apparatus of claim 2 wherein the apex of said seating surfaces lies on the axis of said receptacle outboard of said tank.

4. The apparatus of claim 1 further characterized in that said beveled seating surface of said adapter faces outwardly of said tank and that a force is generated on said hose and said hose connector when said vacuum motor is turned on to generate a vacuum within said tank and said hose, said force applying a positive seating force for sealing said beveled surfaces.

* * * * *